Feb. 19, 1935.   E. T. VINCENT   1,991,587
FUEL INJECTION APPARATUS
Original Filed Sept. 5, 1930   3 Sheets-Sheet 1
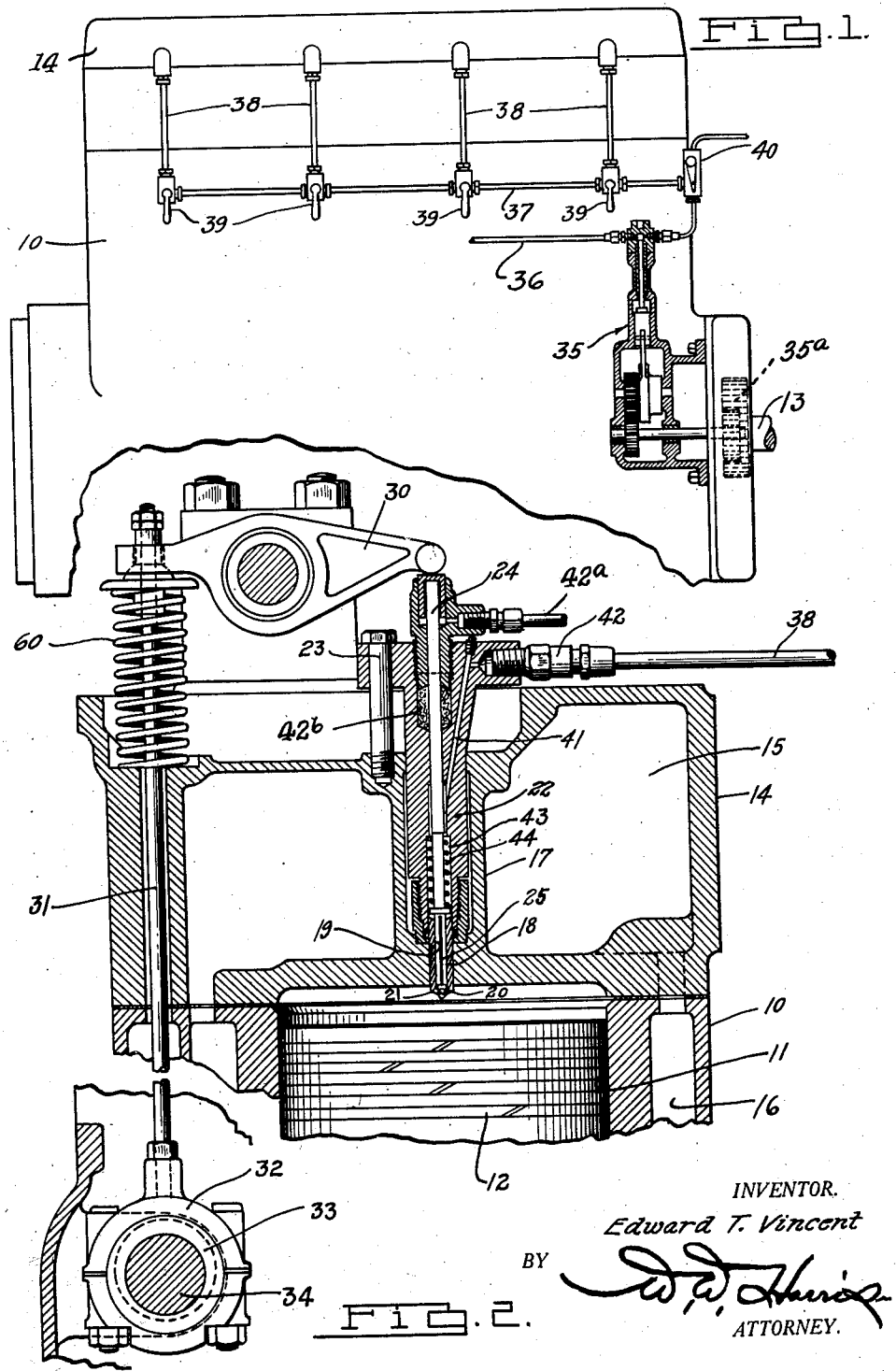
INVENTOR.
Edward T. Vincent
BY
ATTORNEY.

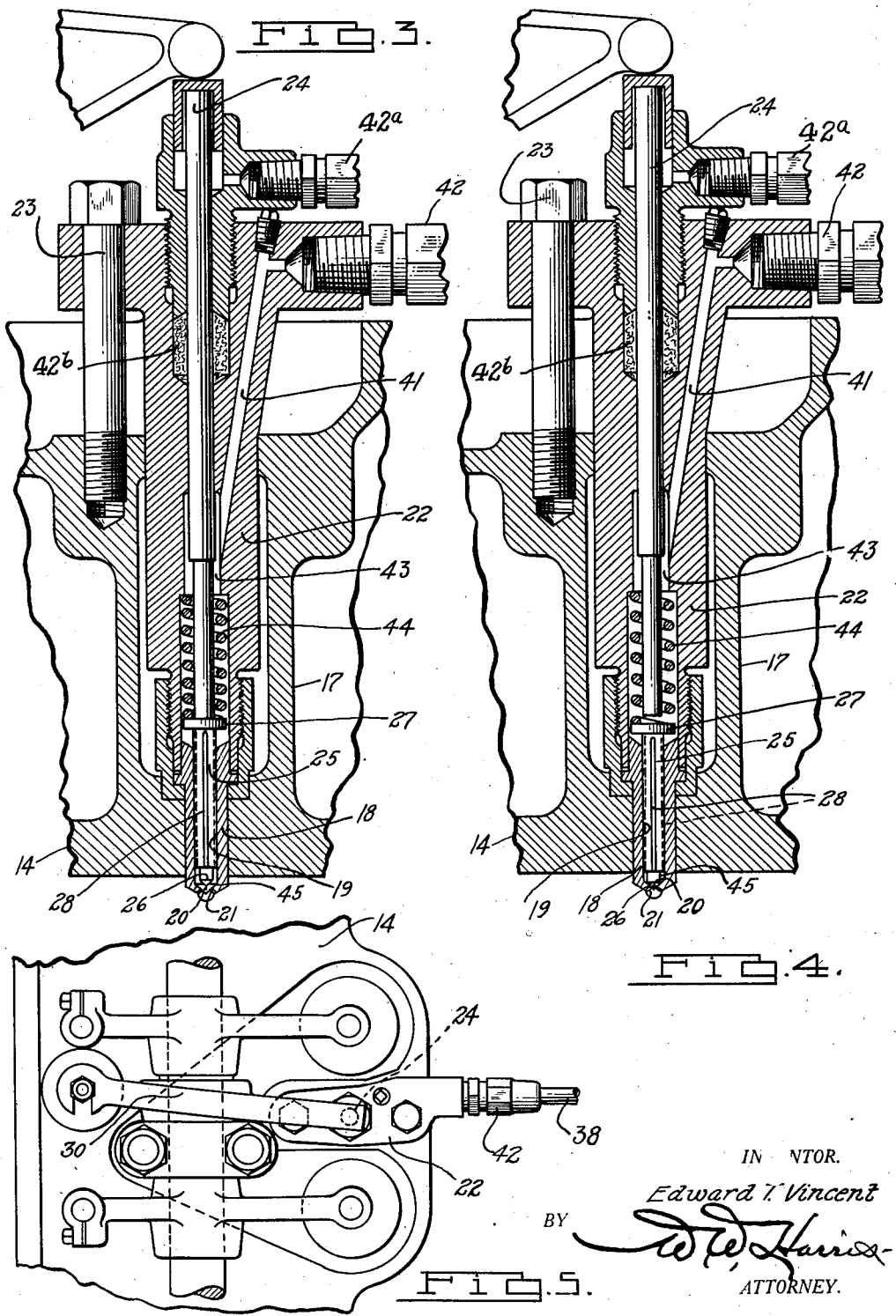

Feb. 19, 1935.   E. T. VINCENT   1,991,587
FUEL INJECTION APPARATUS
Original Filed Sept. 5, 1930   3 Sheets-Sheet 3
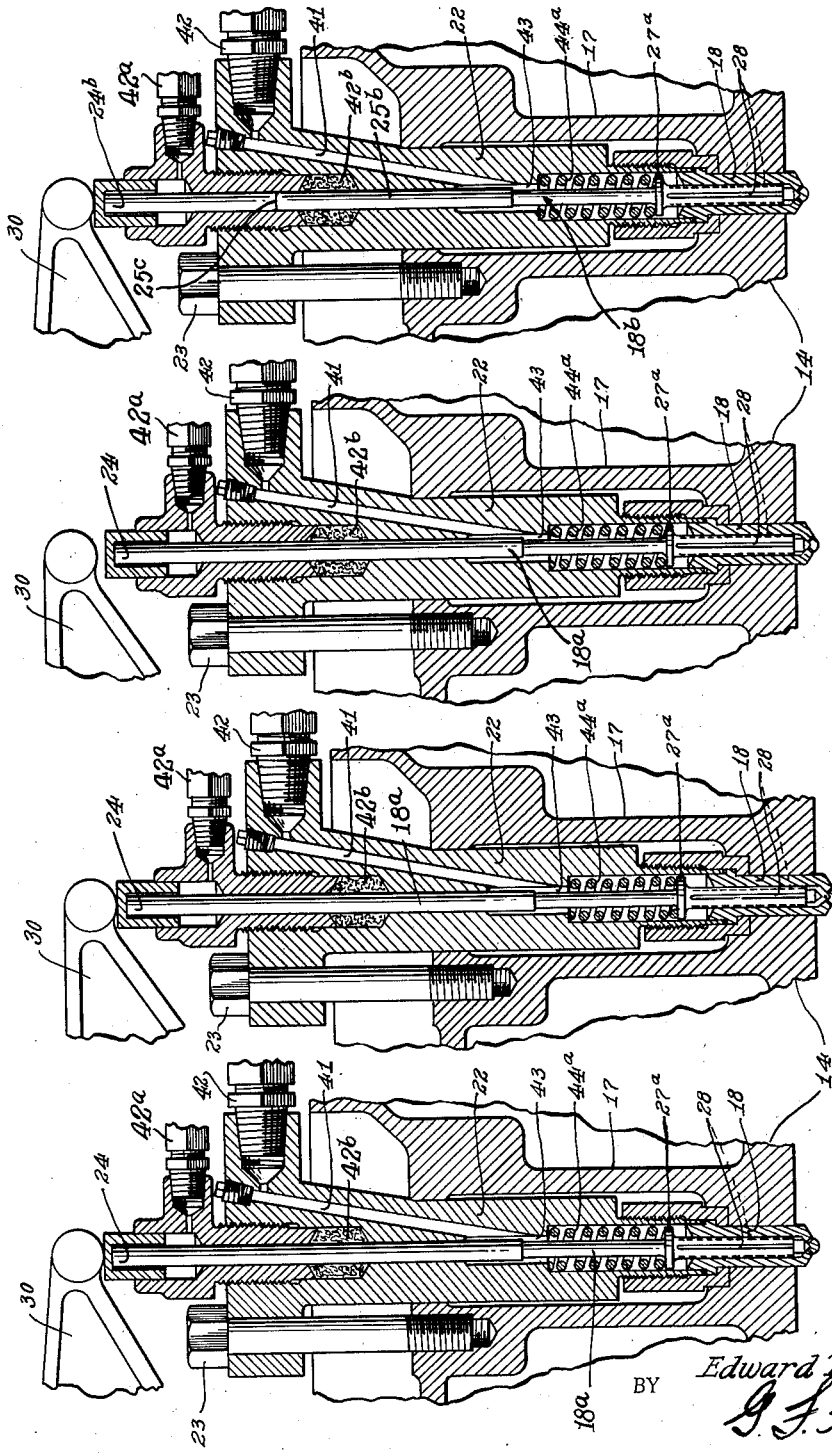
INVENTOR.
Edward T. Vincent
BY
G. F. Hauk
ATTORNEY.

Patented Feb. 19, 1935

1,991,587

UNITED STATES PATENT OFFICE 1,991,587

FUEL INJECTION APPARATUS

Edward T. Vincent, Detroit, Mich., assignor to Continental Motors Corporation, Detroit, Mich., a corporation of Virginia Continuation of application Serial No. 479,836, September 5, 1930. This application January 12, 1934, Serial No. 706,414

14 Claims. (Cl. 299—107.5)

My invention relates to an internal combustion engine and more particularly to an engine of the compression ignition type. Two well known systems of fuel injection for engines of this type are the constant pressure system and the jerk system. The former system gives the most power but more skill is required in maintaining the working parts in proper adjustment and the slightest wear of the timing and control mechanism, the cam in particular, may completely cut out one of the cylinders thereby reducing the engine power and overloading the other cylinders. Even though the wear is not sufficient to cut out the cylinder, the power of the cylinder associated with the worn cam is materially reduced. The latter system is more readily maintained in service and results in a better fuel economy, but gives less power. To be more specific it might be noted that the constant pressure fuel injection system is provided with means for mechanically opening and closing the valve for controlling the injection of fuel into the cylinders, while the jerk system is provided with means for automatically opening and closing the valve, and usually provides an individual fuel pump for each cylinder which measures and delivers a predetermined amount of fuel. These pumps are relatively expensive besides providing a multiplicity of parts which are subjected to wear.

It is the object of my invention to provide an engine of the compression ignition type having the advantages of both systems without the disadvantages.

More particularly it is the object of my invention to construct an engine of the compression ignition type by providing means for controlling the injection of fuel into the cylinders having the advantages of the constant pressure fuel injection system for mechanically controlling the opening of the valve which controls the injection of the fuel into the cylinders, and having the advantages of the fuel injection system of the jerk type by automatically closing the said valve.

Another object of my invention is to construct an engine of the compression ignition type provided with a mechanically controlled valve opening means controlling the injection of fuel into the engine cylinders and with means responsive to a predetermined fall of fuel pressure in the source of fuel supply for automatically closing or controlling closing of said valve when a predetermined charge of fuel has been injected into the cylinder.

A further feature of my invention is to construct an engine of the aforesaid type having a fuel reservoir or "rail" in which fuel under pressure is contained for distribution to a plurality of cylinders, said fuel being forced into the reservoir or "rail" by means of a single pump unit of one or more cylinders, the actuation of said pump being timed in such a way as to maintain a predetermined fuel pressure in the "rail" at the beginning of injection of the fuel into each of the respective cylinders.

A still further feature of my invention is to provide means for controlling the initial fuel pressure at the beginning of the fuel injection and consisting preferably of a pressure relief valve permitting the return of excess fuel delivered to said "rail" to the fuel tank, said control means being adapted for manual operation.

A further object of my invention resides in the provision of an improved fuel injection apparatus especially adapted for use in conjunction with an improved fuel pressure supply system, the latter being more particularly described and claimed in my co-pending application Ser. No. 703,440, filed Dec. 21, 1933. Thus, my fuel injection apparatus, in all embodiments hereinafter described, preferably provides an injection valve for each cylinder adapted to function with a rail or fuel supply line in which the fuel pressure is not always constant. I preferably arrange for pumping the fuel in the rail to the desired amount prior to any injection, the pressure falling off during the injection by reason of the valve being open. The elasticity of the fuel in the supply line provides the necessary quantity of fuel injected by reason of the drop in fuel pressure, in conjunction with the fuel pressure at the beginning of injection. The fuel pump is thus preferably arranged to increase the fuel pressure in the rail in the interval between successive injection periods and not during injection. I desire to point out however, that my improved fuel injection apparatus may be used in conjunction with other fuel pressure supply systems and my claims are therefore not so limited.

In all embodiments of my invention the valve is unseated for injection by fuel pressure but only after a relatively heavy spring load on the valve has been relieved by a spring controlling device actuated in properly timed relation with the engine. The valve is then seated to end injection and such seating takes place independently of the relatively heavy spring, the load of such spring being restored on the valve preferably after the valve has been seated.

In one embodiment of my invention the valve is urged toward its seat by a relatively light spring load, causing separation of cooperating valve elements so as to produce a differential pressure acting along with the light spring to seat the valve. The fuel pump is arranged to restore the rail pressure after injection is completed and prior to when the next injection commences. In this embodiment the load of the heavy spring is restored on the valve of any cylinder at any time after the valve has seated and prior to the time for the beginning of the next injection of this same valve, the differential fuel pressure established during valve closing acting along with the light spring to hold the valve on its seat until the cooperating valve elements are brought together again to cause the fuel pressure to urge the valve from its seat.

In a modification of my invention, I have dispensed with the differential pressure for closing the valve, the light spring performing this function alone when the fuel pressure has dropped after injection. In this embodiment it is necessary for the heavy spring to load the valve after injection and prior to the fuel pump pressure restoring action in the rail since in this instance the restoration of fuel pressure would open the valve. The heavy spring load is therefore restored on the valve after injection but before the pumping action on the fuel in the rail and before the time for the next injection to occur.

This application is a continuation of my copending application, Ser. No. 479,836 filed September 5, 1930.

For a more detailed understanding of my invention, reference may be had to the accompanying drawings which illustrate several forms which my invention may assume and in which similar reference characters indicate corresponding parts:

Fig. 1 is a side elevational view of an internal combustion engine of the compression ignition type constructed in accordance with my invention, Fig. 2 is a fragmentary transverse sectional view of the aforesaid engine with the top cover of Fig. 1 removed showing the valve structure and actuating means therefor which controls the injection of the fuel into the engine cylinder, Figs. 3 and 4 are fragmentary sectional views of the fuel injection means showing different positions of its operation, Fig. 5 is a fragmentary plan view of the engine, Fig. 6 is a sectional view of a modified valve structure, the valve being closed or seated prior to injection, Fig. 7 is a like view, the valve being shown unseated during injection, Fig. 8 is a like view, the valve being shown seated at the end of injection but prior to restoration of the heavy spring load thereon, and Fig. 9 is a sectional view of a further modified valve structure, the valve being seated prior to injection.

An internal combustion engine of the compression ignition type may be constructed of any suitable engine block structure 10 having one or more cylinders 11 in which the usual form of pistons 12 are reciprocated, said pistons adapted to be connected in the usual way with the engine crankshaft 13. In the aforesaid type of engine, the fuel is sprayed into the cylinder where it ignites when coming into contact with the compressed air in the cylinder. The means for atomizing the fuel and the means controlling the injection of the fuel into the cylinder are preferably supported by the cylinder head 14 having suitable water jackets 15 communicating with the water jackets 16 about the cylinder 11.

The cylinder head illustrated in the accompanying drawings is preferably provided with a pillar 17 integrally formed with the cylinder head casting and arranged concentrically with respect to the cylinder axis, the pillar being bored out or otherwise constructed with a recess to receive the fuel nozzle and valve structure. The fuel nozzle 18 may be of any standard construction, the same having a central opening 19, a valve seat 20, and one or more openings 21 in the tip of the nozzle. A valve guide 22 is secured in the head by means of bolts 23 or other suitable means. The valve structure in the embodiment illustrated in Figs. 2, 3 and 4 is constructed of a pair of upper and lower cooperating valve elements or portions 24 and 25 respectively, the lower valve portion 25 being provided with a valve element 26 at its lower end, a head or flange 27 at its upper end, and longitudinally extending grooves 28. The upper valve portion 24 is guided directly in the valve guide and arranged to abut the top face of the head 27 carried by the lower valve portion. A conduit 42$^a$ may be provided to conduct away from the upper end of the valve structure any fuel which might leak past the packing 42$^b$.

The valve structure is held on its seat by the pressure of the relatively heavy load of spring 60 acting through the rocker arm 30 which is engaged with the valve structure. Means may be provided for positively actuating the rocker arm, but I have preferably devised a means for releasing the spring pressure from the rocker arm. This is preferably accomplished by compressing the spring by actuating the pull rod 31 through the agency of the eccentric strap and eccentric 32 and 33 respectively, said eccentric being keyed or otherwise secured to the cam shaft 34.

The fuel is conducted to a pump 35, through a pipe or conduit 36 from a fuel tank (not shown) or other source of fuel supply and thence forced into a fuel supply line 37 or reservoir, commonly known as a "rail". Branch pipes or conduits 38 connect the "rail" with each of the cylinders, and if desired suitable valves 39 may be employed for respectively shutting off the supply of fuel to any one of said cylinders. A pressure relief valve 40 may be employed to maintain a predetermined initial fuel pressure in the fuel line or "rail" at the beginning of the injection. I preferably connect the fuel pump up with the engine mechanism in such a way as to actuate the pump to bring the fuel pressure up to a predetermined maximum at the time of each injection. One or more strokes may be given to the pump, and one or more pump cylinders may be employed, but preferably the pump is constructed so that each stroke of the pump will bring the fuel pressure up to the required amount so as to provide a predetermined constant pressure in the "rail" at the time of injection.

The fuel pump 35 is driven by gearing 35$^a$ from crankshaft 13 in timed relation to camshaft 34 so that the fuel pressure in rail 37 will be restored after any injection, the fuel pump increasing the fuel pressure in the rail subsequently to any injection and prior to the beginning of the next injection thereafter. In other words, the pump is not relied on to produce pressure during any injection, the initial pressure at the beginning of injection and the elasticity of the fuel in the supply system providing for the desired quantity of fuel injected in a manner more particularly hereinafter set forth.

The branch pipes or conduits 38 are arranged to be connected with a passage 41 in the valve guide by a union 42 or other suitable fitting. The passage 41 communicates with an enlarged bore 43 within the valve guide, the bore 43 being slightly larger than the head of the lower valve portion 25 to permit the fuel to flow freely past the head. A relatively light load compression coil spring 44 bears on the head 27 yieldingly urging the valve on its seat. The fuel may flow through the grooves 28 in the valve portion 25 into the nozzle chamber 45 formed by the reduced end portion of the valve portion 25.

Thus when the spring 60 is compressed, releasing the rocker arm, the fuel pressure may then lift the valve, this pressure exerting a lifting force on the valve portions 24 and 25 greater than the remaining forces tending to seat the valve structure. Immediately on lifting of the valve the fuel is sprayed into the cylinder under pressure, and the pressure of the fuel in the "rail" will rapidly fall, as well as the fuel pressure in the bore 43 that is in open communication with the "rail." When the fuel pressure falls a predetermined amount sufficient to allow the spring 44 to overcome the differential in pressure action on the valve portion 25, the spring 44 will force the lower valve portion 25 downwardly and separate the valve portions 24 and 25. The lower valve portion which carries the valve is quickly snapped down because as soon as the valve portions are separated, there is a bigger area exposed to the remaining fuel pressure tending to lower the valve. Thus I have obtained quick automatic closing of the valve in response to a predetermined fall of fuel pressure. Even though the fuel pressure in the "rail" is built up before the upper valve portion is lowered again by the spring 60 actuated rocker arm 31, the lower valve portion will remain seated, because of the differential in pressures acting down on the same. After the upper valve portion is forced down and seated on the head 27 of the lower valve portion by relieving the compression of spring 50, the differential of fuel pressure is reversed and the valve is held seated until the spring 60 is again compressed releasing the downward pressure of the spring 60 on the valve structure. The fuel pump 35 is timed with the crankshaft 13 as aforesaid and with camshaft 34 so that the pressure of fuel in rail 37 is restored after each injection takes place and prior to the beginning of the next injection, the pump not being operative for restoring the fuel pressure during any injection. Thus, for the four cylinder four-stroke cycle engine illustrated, an injection takes place every 180° of crankshaft rotation, as is customary, gearing 35ª for pump 35 being indicated as imparting two strokes to the pump for one revolution of crankshaft 13. For other numbers of cylinders and for two cycle engines the timing of the parts will obviously vary.

While the heavy spring 60 is designed to load the valve element after the same is seated by other means, there are occasions where said heavy spring is released for loading the valve element at the same time said valve element is seated or prior to the seating of the valve element by said other means, the heavy spring thus seating the valve element. Such an occasion may arise when the engine is operated at peak loads or when subjected to excessive loading, for the reason that under such conditions of engine operation, it is found that the injection period may be abnormally prolonged, resulting in excessive fuel consumption and reduction of power output.

The pump 35 delivers excess fuel at all loads so that, by adjusting the pressure relief device or regulator 40, the pressure of the fuel in rail 37 may be varied and in this way the quantity of fuel injected may be governed to control the engine power output.

Just by way of example, I have operated engines constructed according to my invention, wherein the fuel pressures in pounds per square inch in rail 37 varied from approximately 800 to 900 at idling speeds to approximately 4000 at full load, the pressures in pounds per square inch in rail 37 falling off after any injection to approximately 300 to 500 at idling speeds and to approximately 1,000 to 2,000 at full load. The pressure in the rail after injection at idling speed will, of course, depend on the load of the light spring 44, such load being approximately 30 to 40 pounds in the engine referred to while the load of the heavy spring 60 was in the neighborhood of 300 pounds. I do not in any way limit my invention to any particular values of the said spring loads, fuel pressures, etc., as these will vary in different engines and according to results and performance desired.

It will thus be noted that I have provided means for mechanically controlling the opening of the valve and for automatically closing the valve independently of spring 60 and camshaft 34. The amount of fuel injected in the cylinder may be readily varied by varying the fuel pressure in the "rail" or supply line at the beginning of the fuel injection period by means of the control valve 40. It may be further noted that it is not necessary to provide a finely adjusted mechanism for controlling the valve lift as the same is lifted the maximum amount at each operation of the fuel injection means, whatever the engine speed or load may be. Thus I have provided what may be termed as a constant stroke means timed with the engine for controlling the opening of the fuel injection valve and independent means regulating the quantity of fuel injected into the cylinder. A quick return of the rocker arm is not necessary as the valve is automatically closed independently of the valve opening mechanism, the rocker arm loading the valve at any time after the valve has been seated and prior to the time for the next injection for the same valve.

Another advantage of my construction is that in the event of the failure of the spring 60 to function, or the failure of the upper valve portion to seat on the lower valve portion, the lower valve portion 25 will automatically cut off the cylinder associated therewith from the fuel supply line or "rail" as the valve remains closed due to the pressure of the spring 44 and the differential in fuel pressure acting in the direction of the valve seat.

The successful operation of an engine of the compression ignition type depends largely on the proper timing and control of the fuel injection and my construction is simple but very effective in providing such a control without frequent adjustment. Wear such as will materially affect the operation of an ordinary engine having a constant pressure fuel injection system, will not affect the operation of my engine.

It will be further noted that my construction is well adapted for use with an engine of the heavy oil compression ignition type as well as with engines employing light fuel oils or other fuel.

Referring to Figs. 6 to 8 I have illustrated a modified valve structure for use in the same valve actuating mechanism and fuel supply system as shown in Figs. 1 to 5, and in order to avoid unnecessary duplication, the illustration and description of this modification is confined for the most part to parts having a different construction or operation. Many of the valve parts are the same in construction and operation as indicated by similarity of reference characters.

In Figs. 6 to 8 the valve 18ª is not divided within the bore 43 but is a one-piece member separating from the end of the valve cooperating element or rocker 30 as will presently be apparent. Spring 44ª acts on valve shoulder 27ª, this spring in this case being relied on to move valve 18ª to its seat after the fuel pressure has sufficiently dropped pursuant to an injection of fuel. Spring 44ª may be slightly heavier than spring 44 of Fig. 2 for corresponding action, the closing action of spring 44 on valve 18 being assisted by the creation of a differential pressure as aforesaid. In any event spring 44ª is relatively light compared to spring 60 acting on rocker arm 30 of Figs. 6 to 8 in the manner hereinbefore described.

In operation of the Fig. 6 to 8 modification, the fuel pressure prior to injection tends to unseat valve 18ª as in the case of valve 18 of Fig. 2. In Fig. 6 rocker 30 is holding valve 18ª seated. In Fig. 7 injection is taking place, rocker 30 having been moved to unload spring 60 and the fuel pressure having unseated valve 18ª. When the fuel pressure drops sufficiently, spring 44ª then moves valve 18ª toward its seat ending injection as indicated in Fig. 8. In this instance the fuel pump 35 is timed so that the fuel pressure in rail 37 is not restored until after rocker 30 again transfers the load of spring 60 to the valve, since otherwise the valve would unseat in response to the pump and not in response to rocker 30. Thus, after any injection takes place, the rocker arm associated with the valve controlling such injection must be restored to load the heavy spring 60 on such valve prior to a pressure impulse of pump 35 in rail 37. In other words, when pump 35 is actuated to restore the fuel pressure to the rail, all rocker arms 30 must be in the position of Fig. 6 loading the associated valves, while in Fig. 2 the pump may operate after valve closing, and prior to rocker arm loading movement due to the differential pressure created by the separating valve parts of Fig. 2. However, in Fig. 2 and Fig. 6 a similar timing of camshaft 34 and pump 35 may be used as follows. After injection of any valve, the valve will automatically seat due to the drop in fuel pressure. After valve seating, the camshaft 34 may restore the load of spring 60 on the valve, and then pump 35 may restore the fuel pressure in rail 37, the system then being ready for the next injection in the engine firing order.

In Figs. 6 to 8, the valving structure controlling injection of fuel in this modification may be referred to as including the valve element 18ᵇ and the valve controlling element or rocker arm 30 which cooperates with the valve element. In Figs. 6 to 8 as well as in Fig. 2, I have therefore provided an element cooperating with the valve so that the valve may seat ahead of restoration of the load of spring 60 on the valve and this is also applicable to the further modification of Fig. 9 as will hereinafter be apparent.

As a further modification, I have illustrated, in Fig. 9, a valve 18ᵇ which operates just as described in reference to the valve shown in Fig. 6. In Fig. 9, however, the valve 18ᵇ is formed with cooperating parts 24ᵇ and 25ᵇ separated at 25ᶜ above the fuel containing bore 43. This construction somewhat facilitates the manufacture of the valve in relatively short pieces compared to the single piece of Fig. 6, but valve 18ᵇ of Fig. 9 operates just the same as valve 18ª of Fig. 6 and is therefore not shown in the different positions of its operation.

It will be apparent to those skilled in the art to which my invention pertains that various modifications and changes may be made therein without departing from the spirit of my invention or from the scope of the appended claims.

What I claim as my invention is:

1. In an internal combustion engine of the compression ignition type having a cylinder provided with a fuel inlet opening and means including a port for atomizing fuel, a divided valve for controlling the injection of fuel into said cylinder and comprising a pair of valve portions positioned end to end, a valve seat, mechanically operated means engaging said valve structure for holding said valve on its seat, means for applying fuel pressure to lift said valve when said mechanically operated means is released, one of said valve portions engaged with said mechanically operated means and the other arranged to open or close the port, yieldable means for separating said valve portions, said yieldable means actuated in response to a predetermined fall of fuel pressure, thereby permitting the application of fuel pressure to said latter valve portion in addition to the force exerted by said yieldable means to automatically seat said latter valve portion on its seat.

2. A fuel injection apparatus for engines of the compression ignition type comprising a valve controlling injection of fuel to the engine, means conducting fuel under pressure to said valve whereby the fuel pressure tends to open said valve when said valve is in its closed position, means timed with the engine controlling the opening of said valve, and means responsive to the drop in fuel pressure resulting from an opening movement of said valve for causing the fuel pressure to act on said valve to close said valve, said last named means including an element cooperating with said valve to expose a portion of said valve to the fuel pressure when said fuel pressure drops after valve opening, said element covering said valve portion prior to valve opening.

3. A fuel injection apparatus for engines of the compression ignition type comprising a valve controlling injection of fuel to the engine, means conducting fuel under pressure to said valve whereby the fuel pressure tends to open said valve when said valve is in its closed position, means timed with the engine controlling the opening of said valve, and means responsive to the drop in fuel pressure resulting from an opening movement of said valve for causing the fuel pressure to act on said valve to close said valve, and means cooperating with the valve and providing a pressure differential exerted on said valve by the fuel whereby said valve opens and closes under pressure of the fuel.

4. A fuel injection apparatus for engines of the compression ignition type comprising a valve controlling injection of fuel to the engine, means conducting fuel under pressure to said valve whereby the fuel pressure tends to open said valve when said valve is in its closed position, means timed with the engine controlling the opening of said valve, and means responsive to the drop in fuel pressure resulting from an opening movement of said valve for causing the fuel pressure to act on said valve to close said valve, and a spring acting on said valve tending to close said valve and thereby supplementing the fluid pressure acting on said valve during the aforesaid valve closing.

5. A fuel injection apparatus for engines of the compression ignition type comprising, a valve structure controlling injection of fuel to the engine, said structure including a valve element and a valve controlling element cooperating with the valve element, means conducting fuel under pressure to said valve element whereby the fuel pressure tends to open said valve element when said valve element is in its closed position, a relatively light spring acting on said valve element and tending to close said valve element, a relatively heavy spring acting on said cooperating valve structure and thereby seating said valve element against the valve opening tendency of the fuel pressure, said light spring acting substantially independently of said heavy spring in closing said valve element and means timed with the engine and acting on said relatively heavy spring to unload said valve element to cause the fuel pressure to unseat said valve element.

6. A fuel injection apparatus for engines of the compression ignition type comprising, a valve structure controlling injection of fuel to the engine, said structure including a valve element and a valve controlling element cooperating with the valve element, means conducting fuel under pressure to said valve element whereby the fuel pressure tends to open said valve element when said valve element is in its closed position, a relatively light spring acting on said valve element and tending to close said valve element, a relatively heavy spring acting on said cooperating valve structure and thereby seating said valve element against the valve opening tendency of the fuel pressure, said light spring acting substantially independently of said heavy spring in closing said valve element and means timed with the engine and acting on said relatively heavy spring to unload said valve element to cause the fuel pressure to unseat said valve element, said engine timed means restoring the load of said relatively heavy spring on said valve element after said valve element has closed.

7. A fuel injection apparatus for engines of the compression ignition type comprising, a valve structure having a valve element and a valve controlling element aligned with said valve element and having one end thereof engaging one end of said valve element, said valve structure controlling injection of fuel to the engine, means conducting fuel under pressure to said valve element and to said engaging end of said valve controlling element, a relatively light spring acting on said valve element and tending to close said valve element, a relatively heavy spring acting on said valve controlling element to seat said valve element against the valve opening tendency of the fuel pressure, and means timed with the engine and acting on said relatively heavy spring to unload said valve controlling element to cause the fuel pressure to unseat said valve element, said valve element moving axially away from said valve controlling element in response to fuel pressure drop whereby to expose said engaging end thereof to the fuel pressure.

8. A fuel injection apparatus for engines of the compression ignition type comprising a valve structure having a valve element and a valve controlling element aligned with said valve element, said valve structure controlling injection of fuel to the engine, means conducting fuel under pressure to said valve element and to said engaging end of said valve controlling element, a relatively light spring acting on said valve element and tending to close said valve element, a relatively heavy spring acting on said valve controlling element to seat said valve element against the valve opening tendency of the fuel pressure, and means timed with the engine and acting on said relatively heavy spring to unload said valve controlling element to cause the fuel pressure to unseat said valve element, said valve element moving axially away from said valve controlling element in response to fuel pressure drop whereby to expose said engaging end thereof to the fuel pressure, said engine timed means restoring the load of said relatively heavy spring on said valve element after said valve element has closed.

9. A fuel injection apparatus for engines of the fuel injection type comprising, a device for controlling the injection of fuel to the engine, said device including a valve, a valve actuating element cooperating with the valve, means conducting fuel under pressure to said valve, a fuel pump periodically restoring the fuel pressure after fuel injection, said valve having a portion thereof exposed to said fuel whereby the fuel pressure tends to open said valve when said valve is in its closed position, a relatively light spring acting on said valve and tending to close said valve, a relatively heavy spring acting on said valve actuating element to hold said valve closed against the valve opening tendency of the fuel pressure, and means timed with the engine and acting on said relatively heavy spring to unload said valve to cause the fuel pressure to open said valve, said relatively light spring being operative to move said valve toward its closed position upon a drop in fuel pressure and independently of said relatively heavy spring, said fuel pump being synchronized with said engine timed means so as to restore the fuel pressure after said valve has been closed and prior to the next opening movement thereof, said engine timed means acting after said valve has closed to restore the load of said relatively heavy spring on said valve prior to delivery of said fuel pump.

10. In a fuel injection apparatus for engines of the compression ignition type, a valve element controlling injection of fuel to the engine, loading means cooperating with said valve element and adapted to hold said valve element seated, means conducting fuel under pressure to said valve element, said valve element having a portion thereof exposed to said fuel whereby the fuel pressure tends to unseat said valve element against the action of said loading means, means timed with the engine and acting on said loading means to release the load thereof acting on said valve element, a pump timed with the engine for supplying fuel pressure periodically, said fuel pressure acting to unseat said valve element in response to said actuation of said engine timed means, and yielding means adapted to act on said valve element for moving the valve element toward its seat independently of said loading means upon a drop in fuel pressure, said engine timed means actuating said loading means to restore the load thereof on said valve element after said valve element has been seated.

11. In a fuel injection apparatus for engines of the compression ignition type, a valve element controlling injection of fuel to the engine, loading means including a relatively heavy spring cooperating with said valve element and adapted to hold said valve element seated, means conducting fuel under pressure to said valve element, said valve element having a portion thereof exposed to said fuel whereby the fuel pressure tends to unseat said valve element against the action of said loading means, means timed with the engine and acting on said loading means to release the load thereof acting on said valve element, a pump timed with the engine for supplying fuel pressure periodically, said fuel pressure acting to unseat said valve element in response to said actuation of said engine timed means, and a relatively light spring adapted to act on said valve element for moving the valve element toward its seat independently of said loading means upon a drop in fuel pressure, said engine timed means actuating said loading means to restore the load thereof on said valve element after said valve element has been seated, said pump being synchronized with said engine timed means so as to restore the fuel pressure after said valve has been seated and before the next unseating movement of said valve.

12. In a fuel injection apparatus for engines of the compression ignition type, a valve element controlling injection of fuel to the engine, loading means cooperating with said valve element and adapted to hold said valve element seated, means conducting fuel under pressure to said valve element, said valve element having a portion thereof exposed to said fuel whereby the fuel pressure tends to unseat said valve element against the action of said loading means, means timed with the engine and acting on said loading means to release the load thereof acting on said valve element, a pump timed with the engine for supplying fuel pressure periodically, said fuel pressure acting to unseat said valve element in response to said actuation of said engine timed means, and means adapted to act on said valve element for moving said valve element toward its seat independently of said loading means upon a drop in fuel pressure, said engine timed means actuating said loading means to restore the load thereof on said valve element after said valve element has been seated.

13. In a fuel injection apparatus for engines of the compression ignition type, a valve controlling injection of fuel to the engine, means conducting fuel under pressure to said valve, said valve having a portion thereof exposed to said fuel whereby the fuel pressure tends to unseat said valve when the valve is seated, a valve controlling shaft operated by the engine, a spring, means for transmitting the load of said spring to said valve to hold the valve seated against the fuel pressure, said load transmitting means acting on said valve but having a separating movement relative thereto to permit said valve to seat upon a drop in fuel pressure independently of said load transmitting means, means actuated by said shaft acting on said spring to release the load thereof on said valve to permit the fuel pressure to unseat said valve, means for seating said valve upon a drop in fuel pressure, said load transmitting means acting to transmit the load of said spring to said valve after said valve is seated, and a pump timed with the engine and with said valve controlling shaft for supplying fuel pressure periodically after said valve has been seated.

14. In a fuel injection apparatus for engines of the compression ignition type, a valve controlling injection of fuel to the engine, means conducting fuel under pressure to said valve, said valve having a portion thereof exposed to said fuel whereby the fuel pressure tends to unseat said valve when the valve is seated, a valve controlling shaft operated by the engine, a spring, means for transmitting the load of said spring to said valve to hold the valve seated against the fuel pressure, said load transmitting means acting on said valve but having a separating movement relative thereto to permit said valve to seat independently of said load transmitting means, a rod axially reciprocated by said shaft to compress said spring to release the load thereof on said valve to permit the fuel pressure to unseat said valve, and means for seating said valve upon a drop in fuel pressure, said shaft actuating said rod to restore said spring load through said load transmitting means to said valve after said valve is seated.

EDWARD T. VINCENT.